(12) United States Patent
Dove

(10) Patent No.: US 9,225,932 B2
(45) Date of Patent: Dec. 29, 2015

(54) METHOD AND SYSTEM FOR AUTOMATICALLY DELETING STORED MEDIA CONTENT AFTER PLAYBACK

(75) Inventor: Antony Michael Dove, Yorkshire (GB)

(73) Assignee: EchoStar UK Holdings Limited, Keighley (GB)

(*) Notice: Subject to any disclaimer, the term of this patent is extended or adjusted under 35 U.S.C. 154(b) by 0 days.

(21) Appl. No.: 13/510,258

(22) PCT Filed: Nov. 12, 2010

(86) PCT No.: PCT/EP2010/067420
§ 371 (c)(1),
(2), (4) Date: Jul. 27, 2012

(87) PCT Pub. No.: WO2011/058153
PCT Pub. Date: May 19, 2011

(65) Prior Publication Data
US 2012/0301104 A1    Nov. 29, 2012

(30) Foreign Application Priority Data
Nov. 16, 2009 (EP) .................. 09176142

(51) Int. Cl.
H04N 5/76 (2006.01)
H04N 5/782 (2006.01)
G11B 27/034 (2006.01)
G11B 27/32 (2006.01)
(Continued)

(52) U.S. Cl.
CPC .............. *H04N 5/782* (2013.01); *G11B 27/034* (2013.01); *G11B 27/329* (2013.01); *H04N 21/4122* (2013.01); *H04N 21/4147* (2013.01); *H04N 21/4334* (2013.01); *H04N 21/4335* (2013.01); *H04N 21/47214* (2013.01); *H04N 21/482* (2013.01)

(58) Field of Classification Search
CPC .......... H04N 21/4334; H04N 21/4335; H04N 21/47202; H04N 21/4147
USPC ..................... 386/295; 725/153, 38, 114, 117
See application file for complete search history.

(56) References Cited

U.S. PATENT DOCUMENTS 6,775,461 B2 * 8/2004 Poslinski et al. .............. 386/283
7,394,967 B1 * 7/2008 Potrebic et al. ............... 386/248
(Continued)

FOREIGN PATENT DOCUMENTS

WO    WO 2008/013385 A1 *  1/2008

OTHER PUBLICATIONS

European Patent Office "International Search Report" mailed Feb. 23, 2011; International Appln. Na PCT/EP2010/067420, filed Nov. 12, 2010.

*Primary Examiner* — David Harvey
(74) *Attorney, Agent, or Firm* — Ingrassia Fisher & Lorenz, P.C.

(57) ABSTRACT

A method and system for media content playback and storage utilizes a set-top box including a processor and a storage device. The set-top box is in a system receiving media content which includes a display for displaying the received media content. On receipt, the received media content is associated with stored media content having a common title. A logical order for the received media content relative to the stored media content is determined, in accordance with a determined identifier. If it is determined that the received media content has been accessed for playback the received media content is automatically deleted after it has been played back.

12 Claims, 5 Drawing Sheets

(51) Int. Cl.
*H04N 21/41* (2011.01)
*H04N 21/4147* (2011.01)
*H04N 21/433* (2011.01)
*H04N 21/4335* (2011.01)
*H04N 21/472* (2011.01)
*H04N 21/482* (2011.01)

(56) References Cited

U.S. PATENT DOCUMENTS

| | | | |
|---|---|---|---|
| 7,707,603 B2 * | 4/2010 | Abanami | 725/34 |
| 7,716,714 B2 * | 5/2010 | Kortum et al. | 725/139 |
| 7,725,827 B2 * | 5/2010 | Poslinski | 715/721 |
| 7,870,593 B2 * | 1/2011 | Stuckman et al. | 725/142 |
| 8,073,312 B2 * | 12/2011 | Yoshimaru et al. | 386/291 |
| 8,386,588 B1 * | 2/2013 | Cooley | 709/218 |
| 2002/0174430 A1 * | 11/2002 | Ellis et al. | 725/46 |
| 2003/0053792 A1 | 3/2003 | Janevski | |
| 2003/0163823 A1 * | 8/2003 | Logan et al. | 725/89 |
| 2004/0091235 A1 * | 5/2004 | Gutta | 386/46 |
| 2004/0213546 A1 * | 10/2004 | Poslinski et al. | 386/49 |
| 2005/0213931 A1 * | 9/2005 | Kudara | 386/46 |
| 2006/0062550 A1 * | 3/2006 | Lee | 386/83 |
| 2006/0206819 A1 | 9/2006 | Tsuji et al. | |
| 2007/0122108 A1 * | 5/2007 | Bontempi | 386/83 |
| 2008/0008456 A1 | 1/2008 | Buttars et al. | |
| 2008/0046928 A1 * | 2/2008 | Poling et al. | 725/40 |
| 2008/0065638 A1 | 3/2008 | Brodersen et al. | |
| 2008/0178241 A1 * | 7/2008 | Gilboy | H04N 7/14318 725/114 |
| 2008/0189390 A1 * | 8/2008 | Heller et al. | G11B 27/10 709/218 |
| 2008/0288460 A1 * | 11/2008 | Poniatowski et al. | G06F 17/30646 1/1 |
| 2008/0292266 A1 * | 11/2008 | Kim | 386/52 |
| 2009/0010617 A1 * | 1/2009 | Jones et al. | 386/124 |
| 2009/0158326 A1 * | 6/2009 | Hunt | G06F 3/04817 725/38 |
| 2009/0158336 A1 * | 6/2009 | Newdeck et al. | 725/44 |
| 2009/0249409 A1 * | 10/2009 | Bhogal et al. | 725/86 |
| 2009/0310937 A1 * | 12/2009 | Ellis et al. | 386/83 |
| 2010/0043030 A1 * | 2/2010 | White | 725/58 |
| 2010/0086277 A1 * | 4/2010 | Craner | 386/52 |
| 2010/0175090 A1 * | 7/2010 | Cordray | 725/58 |
| 2011/0176787 A1 * | 7/2011 | DeCamp | 386/241 |
| 2012/0301104 A1 * | 11/2012 | Dove | 386/239 |
| 2014/0089987 A1 * | 3/2014 | Cordray | 725/58 |

* cited by examiner

METHOD AND SYSTEM FOR AUTOMATICALLY DELETING STORED MEDIA CONTENT AFTER PLAYBACK

CROSS-REFERENCES TO RELATED APPLICATIONS

This Application claims priority to International Application No. PCT/EP2010/067420, filed Nov. 12, 2010, which claims priority to European Patent Application No. 09176142.9, filed Nov. 16, 2009.

TECHNICAL FIELD

The present invention relates to a method and system for media content playback and storage.

BACKGROUND

Generally, digital media content is easily recorded, stored, manipulated and/or replayed. Electronic devices, such as set-top-boxes (STBs), personal computers, and other such devices, are able to capture and playback digital media content. The ability to easily record and store content has changed the way many people consume broadcast media content. Although, the programmed content is broadcast at a scheduled time, a user may playback the media content when convenient. Commonly, multiple menu listings are traversed to locate and playback the recorded content. Users may need to manage recorded content by manually deleting content and/or by keeping track of what has already been viewed.

SUMMARY

Various embodiments seek to facilitate the management of media content.

According to a first aspect there is provided a computer implemented method for managing media content comprising receiving media content at a processor, the received media content including at least a title, and storing the received media content, the computer implemented method comprising determining if the received media content has been accessed for playback by the processor; and automatically deleting the received media content as it is played back.

In some embodiments, the received media content is associated with stored media content. As one example, such association may be through a common title. Additionally, a logical order for the received media content relative to the stored media content may be determined. The received media content may be organized relative to the stored media content in accordance with a determined identifier.

In an embodiment, the operation of deleting the received media content comprises deleting only a portion of the received media content that is played back.

Alternatively, the operation of deleting the received media content may comprise deleting the received media content only after the entirety of the received media content has been played.

For example, the operation of deleting the received media content may comprise deleting the received media content only after exiting a playback mode.

In an embodiment, the method further comprises fast-forwarding through a portion of the received media content during playback; saving the portion of the received media content; and deleting the portion of the received media content after normal playback of the received media content resumes.

In some embodiments, the method comprises providing a title listing including a single instance of each title for which media content is stored to a visual output medium; receiving input selecting a title included in the listing; and initiating playback of the stored media content associated with the selected title in the logical order based solely on the selection of title.

In an embodiment, the method further comprises providing episode information related to the stored content associated with the titles included in the menu listing; receiving input selecting an episode provided with the titles; and initiating playback of the selected episode.

Various embodiments also extend to systems for media content playback and storage comprising a processor for controlling operation of the system, a storage device coupled to the processor, and a communications interface for receiving media content for storage, the system being characterised in that the processor is arranged to determine a title and episode for the received media content; compare the title and episode with media content in the storage device; delete the media content if the title and episode coincide with media content in the storage device; and organize the received content into a playlist relative to the media content in storage device.

In an embodiment, the storage device is memory arranged to store software executable by the processor to control the operation of the system. The received media may also be stored in the memory.

In an embodiment, the system comprises at least one user interface for receiving user input; and at least one user interface for providing output to a user; and wherein the processor is arranged to generate a menu containing titles for the media content in the storage device; receive user input selecting a title from the menu containing titles; retrieve media content for the title; and play the retrieved media content.

In some implementations, the processor is arranged to generate a table for each title of media content, the table having pointers to locations of media content in the storage device.

The processor may also organize the media content within the table for each title of media content in a logical order based on episode number.

Additionally, the processor may automatically delete media content after playing the media content.

According to a further aspect of the present invention there is provided a method for operating a media storage and playback device comprising displaying a listing of program titles for playback using the device, the method comprising retrieving media content associated with a user selected program title, the retrieved media content being selected by the device for retrieval based on a chronology of the media content; automatically providing the retrieved media content to an output device for playback; and automatically deleting the retrieved media content after playback of the retrieved data.

In an embodiment, the method further comprises receiving user input to open an episode listing during playback of the retrieved media content, the episode listing comprising a listing of episodes associated with the user selected program title and including the retrieved media content; receiving user input selecting an episode from the episode listing other than the retrieved media content; initiating playback of the selected episode; and providing a pointer to the location in the retrieved media content where playback ceased.

In some implementations, the method further comprises initiating playback of the retrieved media content at the location of the pointer when playback of the retrieved media content is selected.

The method may comprise not deleting a played back portion of the selected episode.

In an embodiment, retrieving media content comprises accessing a table including pointers for the locations of accessible media content; retrieving media content at the location pointed to by a first pointer in the table, wherein the pointers in the table are organized based on a chronology of the accessible media content; and updating the table so that an episode subsequent to the deleted media content is the next retrieved media content.

For example, retrieving the media content comprises accessing a network location.

In some implementations, the method comprises providing an indicator indicating media content as a next retrievable media content.

The method may comprise automatically retrieving and playing a chronologically subsequent episode of the selected programming title.

The present invention also extends to a system incorporating a storage device and a playback device for media content, and a processor arranged to retrieve, playback and delete media content by a method as defined above.

Various embodiments will hereinafter be described, by way of example, with reference to the accompanying drawings, in which:

DETAILED DESCRIPTION

Figure 1:
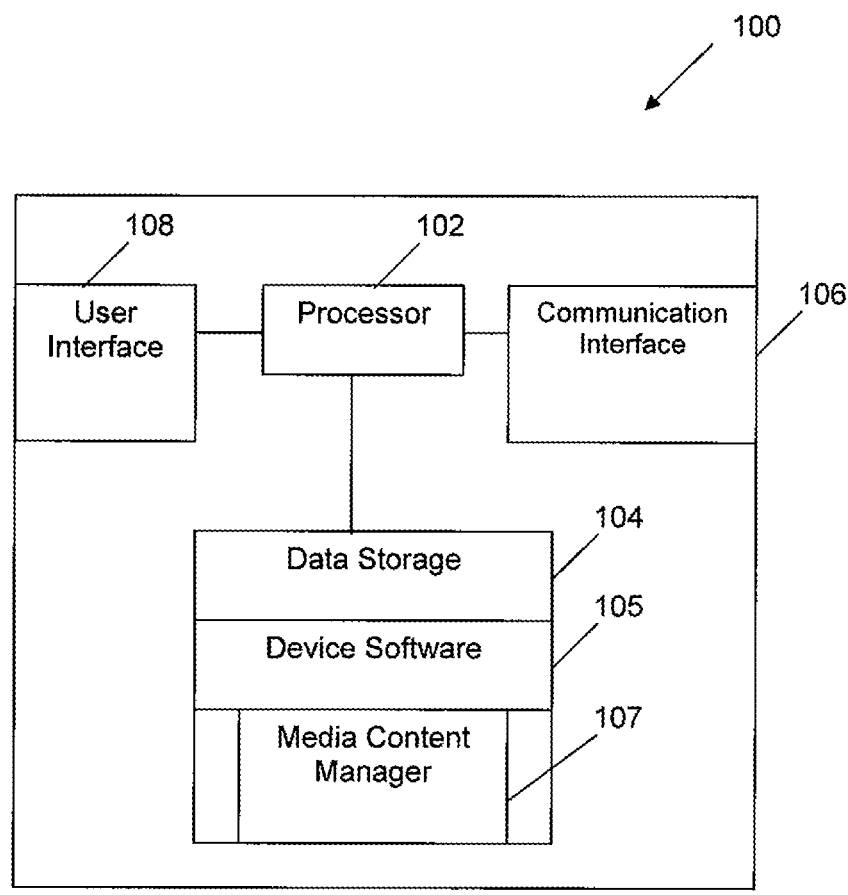
FIG. 1 is a simplified block diagram of an electronic device for storage and organization of media content.

Embodiments discussed herein may take a variety of forms, such as enhanced systems and methods for managing digital media content. "Digital media" may include any video and/or audio media related to satellite, cable, over-the-air, internet and/or other television programming, regardless of the formatting of such media. As will be understood from this disclosure, digital media content utilized with embodiments described herein may be grouped according to certain parameters, such as title or types of programming content, and organized in a logical order for playback. For example, recorded content having a common title may be aggregated under that title in a chronological order (as examples, based on an episode number or transmission date). A user interface menu for the titles, therefore, desirably includes a single instance of each title for which content is stored, thereby providing a relatively uncluttered user interface and enhanced user experience. Further, the embodiments may potentially reduce the processing necessary to display information as part of an electronic program guide, listing of recording or other data structure. Users select any one of the titles for playback to begin. Typically, this involves navigating to a single menu list, thus simplifying menu navigation.

Additionally, digital media content may be automatically deleted in accordance with a particular content deletion scheme. For example, such media may be deleted after being played back. This may permit a user to resume playback of the digital media from the point where prior playback left off, insofar as no digital media content prior to that point remains on storage. Additionally, the automatic deletion of played content prevents storage space from being cluttered with already viewed content.

In one embodiment, content may be deleted only after an entire discrete portion of the content associated with a title is played back. For example, content may be deleted after an entire episode or chapter has been played back. Alternatively, content may be deleted in a continuous manner after a prescribed amount of subsequent content has been played back. For example, content may be stored until five or ten minutes of subsequent content has been played back. This allows for a user to gain a context for the content upon returning to the playback the content. Further, content that has been played back may be deleted when exiting a playback mode. For example, the content is deleted when a user exits a program to return to a menu.

The deleting of content that has been played back may be customizable by a user in accordance with their preferences. For example, the automatic deletion of content that has been played back may be toggled on or off for one or more programs. Moreover, a user may select one deletion scheme (e.g., deletion of content only after a whole episode has been played back) for a first title and a different deletion scheme (e.g., deletion of content only after 10 minutes of subsequent content has been played back) for a second title. These and other embodiments may be better understood with reference to the following discussion and the associated drawings.

FIG. 1 is a block diagram of a simplified electronic device 100 for managing media content. In some embodiments, the electronic device may be a STB, a digital video recorder (DVR), cable receiver box or other television receiver device. In other embodiments, the electronic device 100 may be a desktop computer, a notebook computer, a handheld media player, or the like.

The electronic device 100 includes a processor 102 coupled with a storage device 104. The electronic device 100 also includes a communication interface 106 and a user interface 108. For the sake of simplicity, other components are not illustrated. It should be appreciated, however, that other components, such as a power supply, encoder, decoder, media reader, and so on, may be included in an actual implementation of the electronic device 100.

The processor 102 may be any suitable processor, such as a microprocessor, microcontroller, or similar control circuitry configured to execute software, firmware, and the like (collectively referred to as "software" herein). Such software may be stored in the storage device 104 and configures the processor 102 to perform one or more functions or operations for which the device 100 is designed. For example, the processor 102 may be configured to receive, record and playback media content. In some embodiments, the processor 102 and the data storage 104 (as well as other components) may be implemented as an application specific integrated circuit (ASIC) or as a system-on-chip (SOC).

The data storage 104 may be implemented in any suitable storage medium. For example, the data storage 104 may include volatile data storage, such as dynamic random-access memory (DRAM) or static random-access memory (SRAM), nonvolatile data storage, such as flash memory, magnetic disk drives, solid state drives, and optical disk drives, or combinations thereof. The data storage 104 may include one or more different types of storage or memory media and may employ the different types of storage media in different manners within the device 100.

The data storage 104 typically stores digital data, possibly including an operating system, one or more software applications, and associated software and static data for the processor 102 to access and execute. The data storage 104 may also store variable data, pointer information, and the like utilized by the processor 102 to execute the software. Additionally, the data storage 104 is configured to store media content. A media content manager 107 is provided to manage the media content.

The media content manager 107 may be implemented in software stored on the data storage 104 and executed by the processor 102 to manage the media content. In General, the media content manager 107 may manage the recording, playback and deletion of media content. Additionally, the media content manager 107 may organize media content for playback. This may entail aggregating content based on identifying information (e.g., titles) found in the headers of media content and organizing the content based on secondary identifying information, such as episode, chapter, or broadcast date, for example.

In some embodiments, functionality of the media content manager 107 may be user customizable to suit a particular user's preferences. For example, a user may customize the deletion of the content function to ensure maximum data storage space, to allow for a context buffer, or to preserve recorded content for a particular amount of time. Additionally, the content deletion function may be customizable on a program or title basis to allow different deletion schemes for different programs or titles. That is, content associated with one program may be deleted on an episode basis, while content associated with another program may be deleted on a rolling basis as content is played back. The various deletion schemes may be implemented to free up storage space so that additional and/or different content may be recorded.

The communication interface 106 may be any suitable interface including a WAN interface, LAN interface and/or a wireless network adapter or other suitable interface to allow the device 100 to communication with other devices via communication networks, such as the Internet. For example, the communication interface 106 may include an Ethernet interface, a cable or digital subscriber line (DSL) interface, a Wi-Fi interface, and/or a cellular communication network interface.

The user interface 108 of the electronic device 100 is configured to output audio and/or video to a display. In certain embodiments, it may also receive input from a user in order to control the device 100. The user interface 108 may include or be coupled with any number of input and/or output components to allow the user to interact with the electronic device 100, such as a keyboard, keypad, mouse, joystick, touchpad, visual display, video display, and/or audio speakers. In some cases, the user interface 108 may incorporate a remote control interface to allow the user to provide input to the device 100 remotely.

Figure 2:
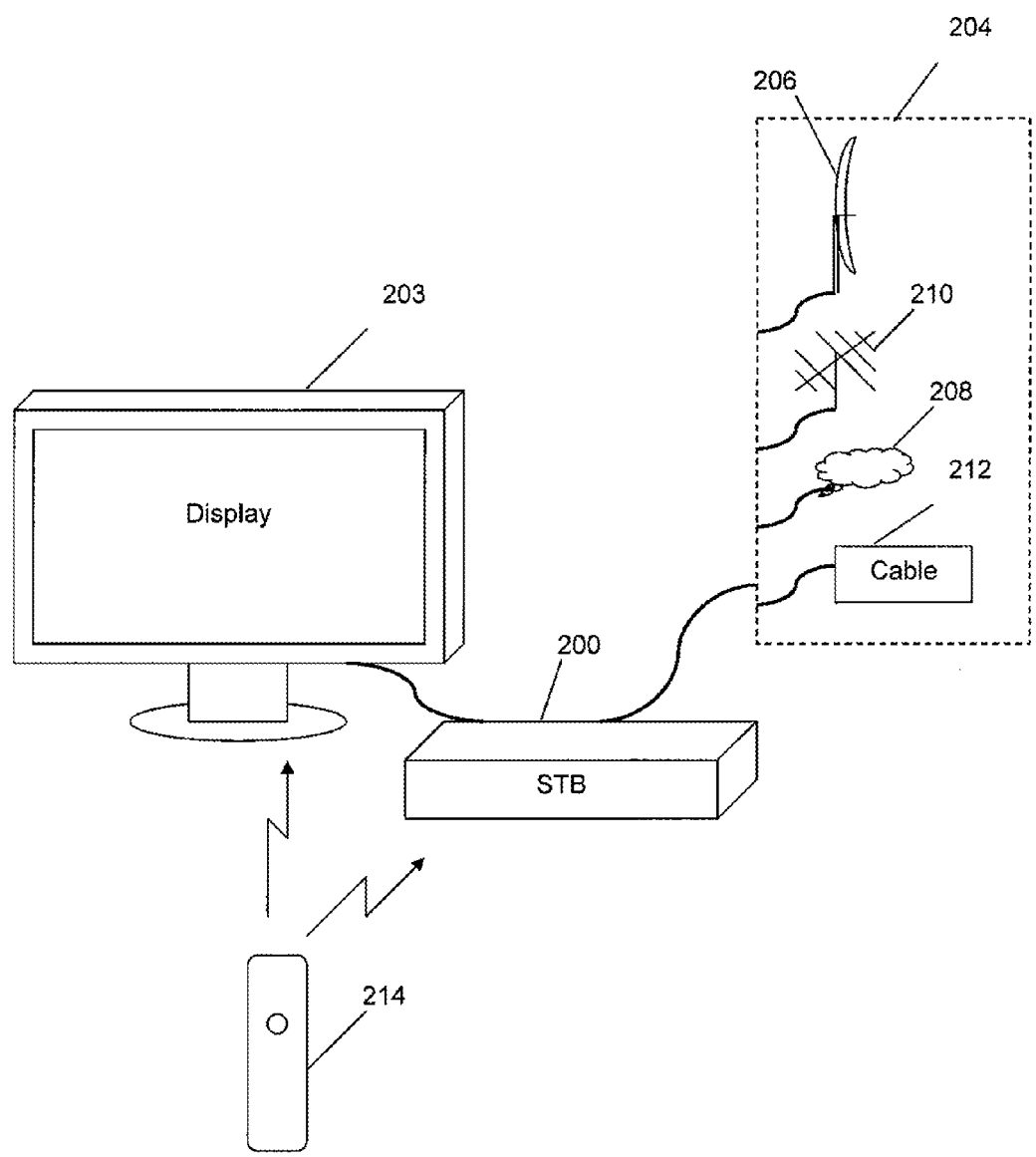
FIG. 2 illustrates a media storage and playback system.

FIG. 2 illustrates the electronic device 100 as a set-top box 200 in a media system 202 including a display 203. The set-top box 200 may be configured to receive media content from one or more media content sources and output the media content to the display 203. Specifically, the set-top box 200 in this embodiment is configured to receive programming from at least one audio/video source 204, such as a satellite and via a satellite antenna 206, a network source via a network connection 208, a terrestrial antenna 210, or coaxial cable headend 212. As such, in set-top box embodiments, in addition to the components depicted in FIG. 1, the device 100 may also include circuitry typically associated with the set-top box 200, such as an antenna or cable input to receive the multiple channels of television programming, one or more tuners for selecting one of the channels, and decoding and/or decrypting circuitry and output circuitry for presenting the audio and/or visual aspects of the selected channel to the user. Also, the device 100 may include a DVR unit for recording selected channels of programming for subsequent viewing. Although such circuitry is not illustrated, it should be appreciated that it may be included in an actual implementation of the device 100. Additionally, DVR functionality may be implemented using the data storage 104 (FIG. 1).

The display 203 is configured to show video and/or audio output provided to the display 203 from the STB 200. The display 203 may be one of any of the various types of commercially available televisions or displays including, for example a cathode-ray tube ("CRT"), liquid crystal display ("LCD"), light emitting diode ("LED"), organic LED, plasma, digital light processing, ("DLP"), etc. Alternatively, a projector and display screen may be used in place of the television. The display 203 may be configured to display standard definition signals, high definition signals, or any other level of definition signals. The display 203 may also display images in a variety of aspect ratios, such as a 4:3 aspect ratio or a 16:9 aspect ratio. As such, the STB 200 may be configured to receive and record digital images having various aspect ratios and levels of definition.

The display 203 and the STB 200 may be communicatively coupled via any standard video communication conduit(s) 22, such as, coaxial cables, component cables, S-video cables, HDMI cables, fiber optics, etc. Additionally, various different communication conduits may connect the content sources 204 to the STB 200 and more than one communication conduit may connect a particular content sources to the STB 200. For example, several coaxial cables may connect the STB 200 to the satellite dish 206 to allow the STB to receive multiple simultaneous transmission streams containing media content.

With respect to the satellite transmissions, the STB 200 and the satellite 206 together may be part of a direct broadcast satellite system incorporating packetized transmission according to a suitable standard, such as MPEG-2, MPEG-4, or the like. Although any programming source that includes television programming and program information, or otherwise transmits data associated with the television programming, is contemplated, the STB 200 and the associated direct broadcast system will serve as an exemplary basis for the disclosure contained herein.

A user may control the operation of the STB 200, display 203, and the direct broadcast system via a remote control device 214. The remote control device 214 may communicate with the processor 102 (FIG. 1) by sending an infrared, radio frequency, or other wired or wireless signal to the user interface 108 that transfers commands to the processor 102. The processor 102 may then execute the commands. In one embodiment, the processor 102 may communicate the received user commands to the direct broadcast system via the communication interface 106.

Referring again to FIG. 1, the media control manager 107 may be implemented on the STB 200 to control the operations of the device 100 or STB 200 with respect to received media content. That is, the STB 200, via execution of the media content manager 107, may organize and delete recorded or saved media content to achieve a streamlined menu navigation for accessing media content. The streamlined menu navigation may include consolidation of all content associated with a particular program or title under a single header and organizing all content associated with a particular title or program in a logical manner for playback. Upon selection of a title or program from a menu, playback automatically begins from a logical starting point. For example, playback may begin at the stored content associated with the title having the lowest episode number. This functionality in combination with the automated deletion of content after playback allows for a user to continuously view content associated with a particular title without having to search through menus listing content associated with the title.

Figure 3:
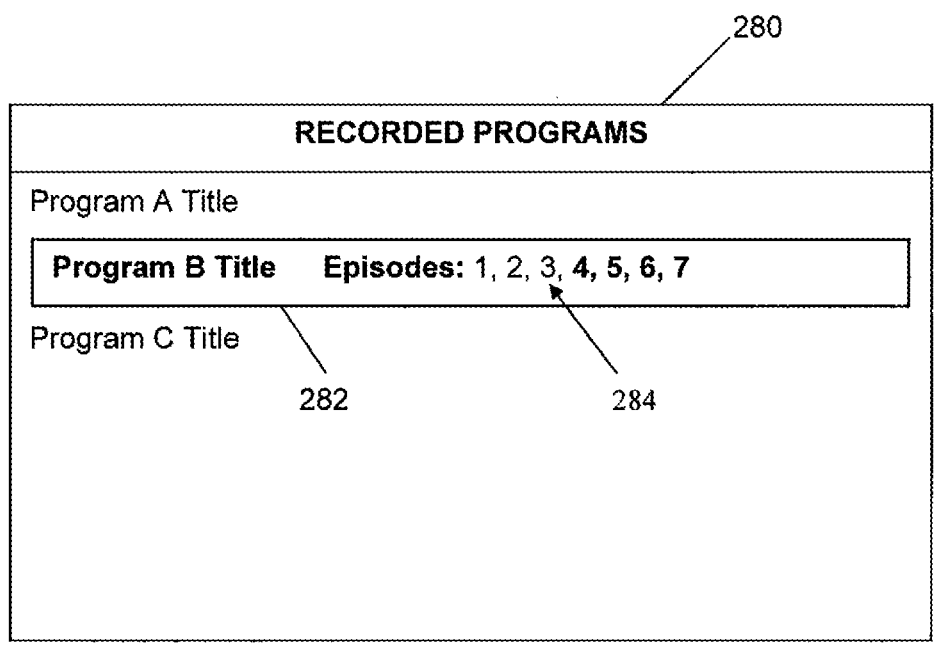
FIG. 3 is an example menu of programming content titles having only a single instance of each title for which media content is available for playback.

FIG. 3 shows an example menu 280 including a listing of program titles that may be displayed on the display 203 (FIG. 2). In accordance with certain embodiments of the present disclosure, each program title is listed only once. All media content associated with the title is consolidated under the single title listing in the menu. A user may navigate the menu 280 using the remote control 214 (FIG. 2) or other input device to select a desired programming title. As illustrated, a user may select a "Program B Title" 282.

As illustrated, the menu listing provides an uncluttered user interface facilitating the selection of desired content for playback. In some embodiments, the title of the content may be the only information listed in the menu. In other embodiments, the title may be accompanied by additional information 284. The additional information may be displayed for a title that a cursor or other indicator is currently on, while all other titles only show the title, for example, and may include a listing of episodes that have been recorded. In particular, the numbers may indicate particular episodes that are available. In another embodiment, the episode listing may display all episodes but gray-out episodes that are not available while highlighting available episodes. Users input a number associated with an available episode to access that particular episode. For example, while on "Program B Title" a user may press the number 5 to access episode 5. Alternatively, the user may simply select "Program B Title" by pressing an enter key, or other such key, to begin playback where prior playback was halted (and played back content was deleted). In the illustrated example, playback would begin at episode 4, for example.

In other embodiments, the title may be followed by a list of dates indicating the dates recorded episodes were originally broadcast or recorded. Dates for deleted content (i.e., content that has been played back) may not be shown. In yet another embodiment a total amount of run time for all the recorded content associated with the title. In yet other embodiments, the additional information 284 may include a number indicating the number of episodes recorded.

Figure 4:
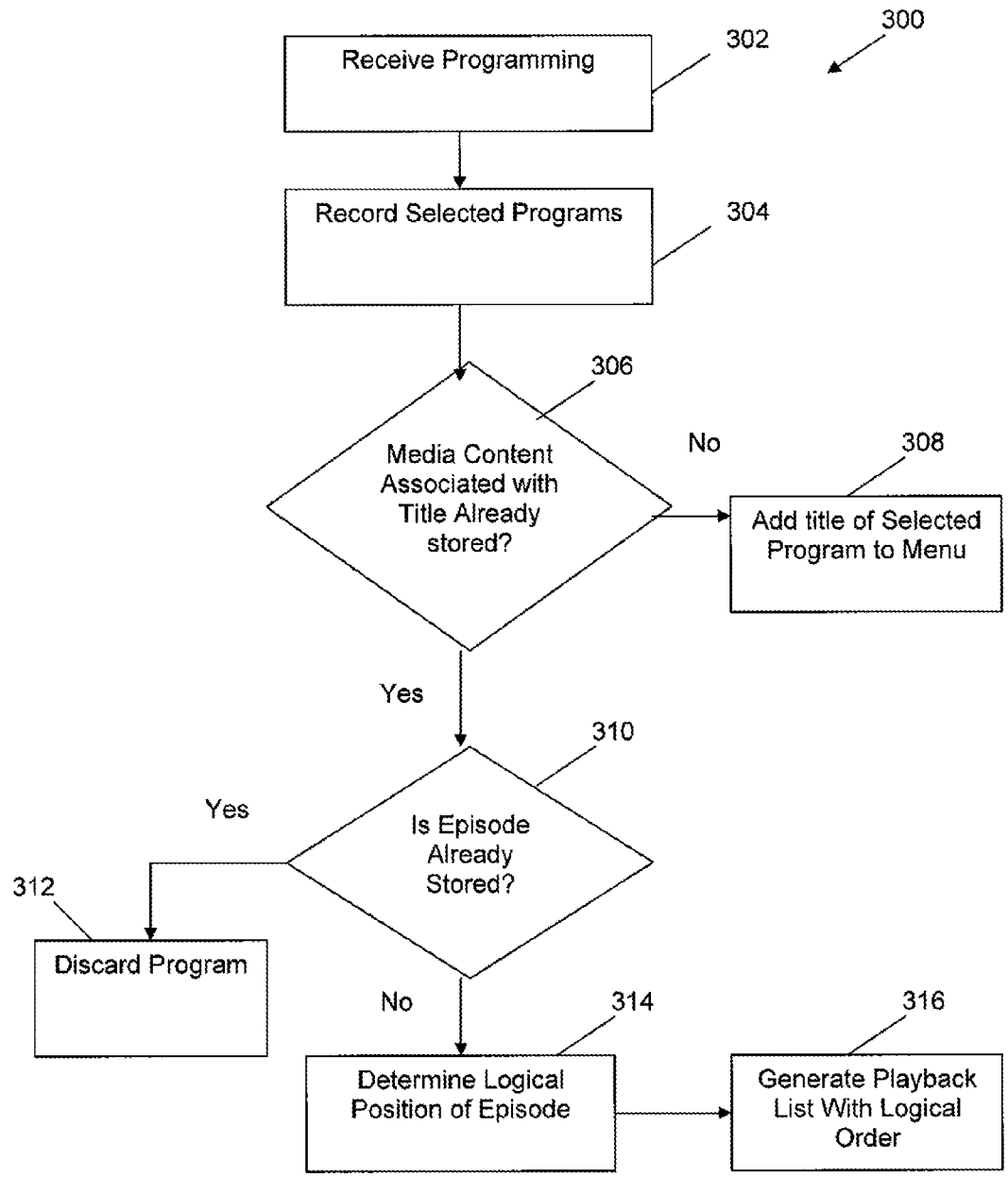
FIG. 4 is a flowchart illustrating a method for media content management.

FIG. 4 is a flow chart 300 illustrating one example of processing media content controlled by the media content manager in accordance with an example embodiment. Initially, media content is received by the STB 200 from one of the content sources 204 (Block 302). The media content is recorded or stored in the data memory 102 of the STB 200 (Block 304). Typically, the STB 200 is configurable to allow a user to select desired programming for recordation by the STB 200. Commonly, a user may select programming that the user prefers based on a title associated with the programming. For example, a user may select "Sex and the City" for recording. The STB 200 may then determine when and on what channel "Sex and the City" is transmitted/broadcast and record the transmissions. Accordingly, the STB 200 records media content of selected programs at the appropriate time and on the appropriate channel (Block 302). The "channel" may be a traditional analog channel (e.g., a particular frequency received by the STB), or may be one or more digital data streams transmitted on a particular transponder.

When recording the selected programs, the STB 200 determines if media content associated with the selected title is already saved on the STB 200 (Block 306). The title may typically be determined from header information associated with the received and/or recorded media content. If no media content associated with the selected title is already stored, the title is added to a menu listing (Block 308). The menu listing may be accessed by the user using the remote control and a user may select titles from the menu listing for playback.

If media content associated with the title is already stored, the STB 200 determines if the received media content matches media content already stored on the STB 200 (Block 310). That is, the STB determines if the media content is duplicative of content already stored on the STB 200. This may be accomplished by comparing information contained in the headers of the media content. In particular, episode, chapter, and/or section names and/or numbers may be compared. If the media content is duplicative of media content already stored on the STB 200, the media content is discarded (Block 312). The discarding of media content may include flagging the content so that the memory space occupied by the media content may be reused.

If the media content is not duplicative, the STB 200 determines a logical position of the media content relative to media content already stored on the STB 200 and related to the same title (Block 314). As one example, the logical position is a chronological order based on the order in which the media content was created or transmitted. Hence, the episode, chapter, and/or section names and/or numbers may be used to determine the order of the media content. In another example, the logical position may be determined based on a timestamp or date associated with the content. The timestamp or date may indicate an original broadcast or release date for the content. In other embodiments, the time stamp may indicate the date when the content was recorded.

Once the relative position of the media content is determined, a playlist for the program title is generated (Block 316). The playlist may be a table, such as a lookup table, that contains a listing of the media content related to a particular title. As such, each title may have a unique lookup table. The table may include information for determining the media content to be played back. In particular, the table may include pointers to memory addresses for media content. The pointers may be listed in an order reflecting the logical order of the media content. The playlist and pointers may not be visible to a user. Instead, the pointers indicate a run order; this run order is shown only if the user specifically elects to do so.

In other embodiments, information may be placed in headers or footers associated with the content to indicate the order. For example, a pointer may be provided within the header information to the logically subsequent content such that the subsequent content may be fetched and concatenated with the earlier content during playback.

Figure 5:
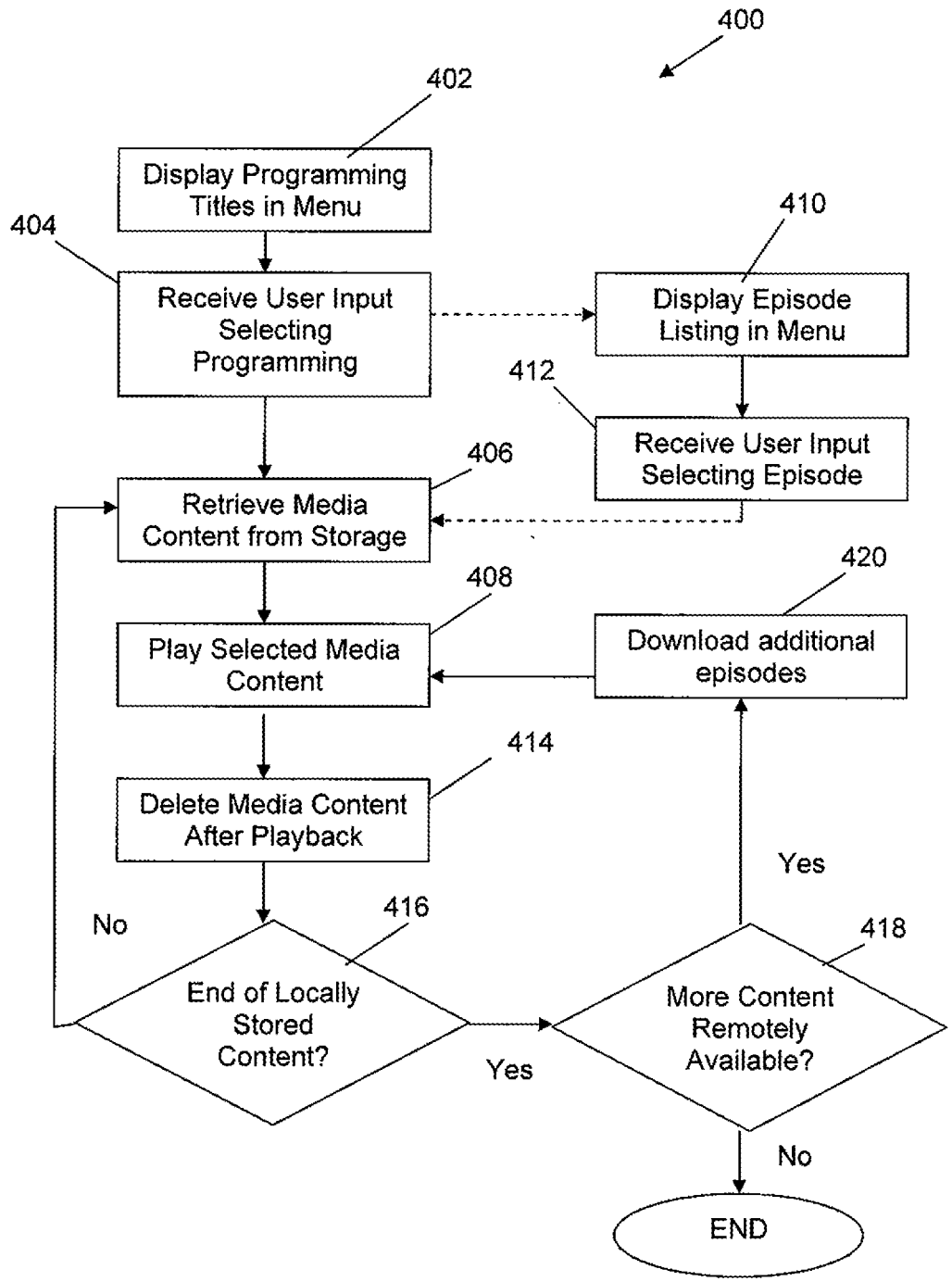
FIG. 5 is a flowchart illustrating a method for media content retrieval and playback.

Turning to FIG. 5, a flowchart 400 showing the playback management of the media content is illustrated. A menu is provided listing the media content as represented by their associated programming titles (Block 402). The menu may be generated by the STB 200 based on media content stored in the data memory 102 (FIG. 1) and is provided from the STB 200 to the display 203 to be viewed by a user. One example of such a menu is shown in FIG. 3, discussed above. As illustrated, generally, content is shown by a single entry displaying the title, not individual episodes.

Upon receiving user input selecting programming (Block 404), the STB 200 may retrieve media content related to the selected programming title (Block 406) and play the media content (Block 408). The retrieval of media content from storage (Block 406) may include referencing the logically organized table to obtain a pointer to the memory location of media content. The retrieved media content is desirably played without traversing another menu (Block 408).

It should be appreciated that several or many of the features associated with the playback of media content may be customizable by a user based on user preferences. For example, in an alternative embodiment, upon receiving user input selecting a menu listing, episodes associated with the selected programming title are listed in chronological order (Block 410). A user may select an episode from the episode listing (Block 412) and, upon selection, the STB 200 may retrieve the media content (Block 406 and plays the media content (Block 408).

Additionally, in another embodiment, a user may be able to access the episode menu "on the fly" during playback of content and move in between episodes of a particular title. If a user moves from a first episode to second during playback of the first episode, the a pointer points to the location where playback stopped within the first episode to allow the user to jump back to that location for continuation of playback of the first episode. Similarly, a pointer points to the location of the second episode when the user returns to the first episode so that the user may again move from the first episode to the location in the second episode where playback was stopped. The auto-deletion functionality may be disabled as to one or more of the episodes when the user moves in-between the episodes. In particular, the content of a chronologically later episode may not automatically be deleted after playback if the episode is accessed out of order.

As the selected media content is played back, the media content is deleted automatically, i.e., without user input (Block 414). Specifically, the media content may be flagged to indicate that the memory location where the media content is stored may be used to record newly received media content. In one embodiment, the deletion of media content occurs after an entire episode has been played back. Thus, for such an embodiment, entire episodes are either stored or deleted. In another embodiment, all content already played back is deleted once playback is stopped by turning off the STB 200, selecting another title for playback, or other such stoppage.

In yet another embodiment, content that has been played back is preserved for a threshold amount of time relative to content playback. More specifically, after content has begun playing, a content playback timer may measure the length of time the content has been played. Once a threshold amount of time has passed, the content that was played prior to the threshold time may be deleted. Thus, a certain amount of played content is saved along with the un-played content. This may function as a "context buffer," which may allow a user to replay certain previously played content. For example, the context buffer may store approximately 5 to 10 minutes of already played media content. This, in turn may allow a user to refresh his memory as to the context of the media content. In some embodiments, the context buffer is preserved even if the program is exited, while in other embodiments, the context buffer is deleted when the program is exited. Additionally, some embodiments may be configured to save context based on the size of a memory location allocated for the context, rather than an amount of time that has lapsed in content playback. Further, in some embodiments, the memory allocated for the context buffer may be larger for high-definition programming than for low definition programming so that approximately the same amount of content (time-wise) may be saved for different definition programming.

Upon reaching the end of an episode, the STB 200 determines if it has reached the end of locally stored content related to the title of the just completed content (Block 416) and automatically retrieves a subsequent episode from storage (Block 406) if there is additional content stored related to the title. Specifically, the STB 200 may refer to the table to find a pointer to next episode and retrieve the content pointed to by the pointer. Additionally, the table may be updated to eliminate the pointer to the episode that has been played back. Alternatively, a pointer to the table may simply be appropriately adjusted to point to a current episode (i.e., the episode that should be played next). In other embodiments, episodes may be appended to prior-recorded episodes as they are stored, such that multiple episodes are contained in a single file.

Additionally, upon completing playback of all stored episodes, the system can playback any additional episodes that are "on demand" or otherwise available through any type of download connection. That is, if there are no more episodes stored or pointed to be the table for playback, the system may autonomously or upon direction from a user determine if there are additional episodes remotely available (Block 418) and download additional episodes (Block 420). In one embodiment, the system may be configured to begin downloading of content automatically when the last recorded episode begins playing. The downloaded content is stored locally to build-up content stored locally for playback.

Additionally, in some embodiments a user may select to not delete content after it has been viewed, as they may like to return to replay the content at another time. The content may be flagged by a user before, during or after viewing the content so that it will not be deleted or flagged for deletion. The user may select an entire title or individual episodes to avoid auto-deletion after playback. The flagging of the content may include selecting or unselecting a deletion option associated with the title or episode. As a default setting, however, the content may be automatically deleted. Upon indication that an episode is not to be deleted, the table referenced for the retrieval of media content may be updated so that an episode subsequent to the just played episode is indicated as the next episode for playback. Thus, the episode first listed in the table may not be played back automatically upon selection of the title, but rather the episode that is indicated for playback. The played content that is not deleted may be accessed by accessing a menu listing all available/stored episodes. When content is deleted, the indicator may similarly indicate the subsequent episode as the next episode to be played, however, the table may not include a listing of the chronologically earlier episode.

In addition to selecting content for avoidance of the auto-deletion, the auto-deletion may be configured to auto-delete only at the end of an episode or when the user exits a playback mode. With respect to the deletion only at the end of an episode, the episode should be completed before any of the episode is deleted. In contrast, if set to delete when exiting a playback mode, portions of the episode may be deleted. For example, if 15 minutes of a 30 minute episode have been played back, then 15 minutes may be deleted. In an alternative embodiment discrete time-wise steps may be deleted as the content is played back. For example, content may be deleted in two minute, five minute, ten minute or any discrete time increment and only after all content within the time-step has been played back. In yet another alternative embodiment, content may be deleted in a continuous manner while preserving a context buffer, as described above.

The auto deletion may be disabled during fast-forward operations. By disabling the auto-deletion during fast-forward, a user may return to the content inadvertently missed by fast forwarding too far. Additionally, in one embodiment, the auto-deletion may resume after the a period of time. For example, auto-deletion may resume after a fast-forward operation after one minute (or any other amount or time) of regular playback. Thus, content inadvertently skipped through a fast-forward operation is not deleted until a user has had the opportunity to return and view the skipped content.

In another embodiment, the media content is not stored locally with the STB 200. For example, the media content may be stored at a network location accessible by the STB 200. The media content may be catalogued or indexed to allow a user to easily find and select media content based on programming titles. The selection of a title begins retrieval and/or playback of the media content. Upon retrieval of the media content, the content may be stored locally in volatile memory or in non-volatile memory for playback. An indicator may be stored in a memory local to the STB 200 or remotely at the network location. The indicator points to the location of the next logical media content associated with the title from which content has been received and/or played back. Accordingly, when a user accesses the network location again, the indicator is used to retrieve content that has not been viewed.

While examples embodiments have been discussed, it will be appreciated that other implementations are possible. For example, while the above embodiments focus on implementations involving a television set-top box, the system may incorporate any suitable electronic device employing a processor, a memory and software for storing and playback of media content.

The invention claimed is:

1. A computer implemented method executable by a television receiver device to manage media content, the computer implemented method comprising:
   receiving the media content as a television broadcast of a television show by the television receiver device;
   storing the received media content by the television receiver device, wherein the storing comprises determining a logical position of the received media content within a sequential order of episodes of the same television show according to the date that the episodes of the television show were first broadcast;
   determining, by the television receiver device, whether the received media content has been accessed for playback by the processor;
   responsive to determining that the received media has been played back, the television receiver device automatically downloading the additional episode of the received media content from the media server when an additional episode of the received media content corresponding to the next episode in the sequential order is available to the television receiver device from a remotely-located media server other than the television broadcast to thereby allow for playback of multiple episodes of the television show in the order that the episodes were first broadcast;
   subsequently receiving a user input instructing to open an episode listing during playback of an episode of the television program, the episode listing comprising a listing of episodes associated with the television show and including the downloaded additional episode;
   receiving user input selecting an episode from the episode listing other than the episode that is currently being played back;
   marking a pointer to the location in the episode currently being played back where playback ceased to thereby permit the television receiver device to return to the same location during subsequent playback; and
   initiating playback of the episode instructed by the user input.

2. A method as claimed in claim 1, further comprising automatically deleting the received media content after only a portion of the received media content that is played back.

3. A method as claimed in claim 1, further comprising automatically deleting the received media content only after the entirety of the received media content has been played.

4. A method as claimed in claim 1, further comprising automatically deleting the received media content only after exiting a playback mode.

5. A method as claimed in claim 1, further comprising:
   fast-forwarding through a portion of the received media content during playback;
   saving the portion of the received media content; and
   deleting the portion of the received media content after normal playback of the received media content resumes.

6. A method as claimed in claim 1, further comprising:
   providing a title listing including a single instance of each title for which media content is stored to a visual output medium;
   receiving input selecting a title included in the listing; and
   initiating playback of the stored media content associated with the selected title in the logical order based solely on the selection of title.

7. A method as claimed in claim 6, further comprising:
   providing episode information related to the stored content associated with the titles included in the menu listing;
   receiving input selecting an episode provided with the titles; and
   initiating playback of the selected episode.

8. A method as claimed in claim 1, further comprising reinstating playback of the previously-played back episode from the location of the pointer.

9. A method for operating a media storage and playback device comprising displaying a listing of program titles for playback using the device, the method comprising:
   receiving media content associated with a user selected program title as a television broadcast of a television show at the device;
   determining a logical position of the received media content within a chronology of episodes of the same television show according to the date that the episodes of the television show were first broadcast;
   storing the media content received as the television broadcast in conjunction with other episodes of the same television show, the received media content being stored by the device for retrieval based on the chronology in which the episodes were first broadcast;
   providing the retrieved media content to an output device for playback;
   in response to the device determining that the retrieved media content has been played back, determining whether an additional episode of the received media content corresponding to the next episode in the chronology is available from a media server other than the television broadcast that is remotely located from the media storage and playback device, and, when the additional episode is available, automatically retrieving the additional episode from the remotely-located media server to thereby allow for playback of multiple episodes of the television show in the order that the episodes were first broadcast;
   receiving user input to open an episode listing during playback of the retrieved media content, the episode listing comprising a listing of episodes associated with the user selected program title and including the retrieved media content;

receiving user input selecting an episode from the episode listing other than the retrieved media content;

initiating playback of the selected episode; and providing a pointer to the location in the retrieved media content where playback ceased.

10. A method as claimed in claim 9, further comprising initiating playback of the retrieved media content at the location of the pointer when playback of the retrieved media content is selected.

11. A television receiver device comprising:

a television interface configured to receive broadcasts of television shows;

a network interface;

a data storage; and a processor configured to receive the broadcasts of television shows via the television interface and to store the received broadcasts in the data storage, wherein the processor determines a logical position of the received media content within a sequential order of episodes of the same television show according to the date that the episodes of the television show were first broadcast;

wherein the processor further determines whether the received media content has been accessed for playback by the processor and, responsive to determining that the received media has been played back, the processor automatically downloads the additional episode of the received media content via the network interface when an additional episode of the received media content corresponding to the next episode in the sequential order is available from a remotely-located media server other than the television broadcast to thereby allow for playback of multiple episodes of the television show in the order that the episodes were first broadcast;

wherein the processor, in response to subsequently receiving a user input selecting an episode other than the episode currently being played back from an episode listing during playback of an episode of the television program, marks a pointer to the location in the episode currently being played back where playback ceased to thereby permit the television receiver device to return to the same location during subsequent playback and initiates playback of the episode other than the episode currently being played back that was instructed by the user input.

12. The television receiver device of claim 11 wherein the processor further reinstates playback of the previously-played back episode from the location of the pointer.

* * * * *